United States Patent [19]
Wei

[11] Patent Number: 6,116,554
[45] Date of Patent: Sep. 12, 2000

[54] TRIPOD

[76] Inventor: David Wei, 6F, No. 17, Der-Huey Street, Taipei, Taiwan

[21] Appl. No.: 09/396,370

[22] Filed: Sep. 15, 1999

[51] Int. Cl.[7] .................................................. F16M 11/12
[52] U.S. Cl. ................................... 248/183.1; 248/187.1; 396/428
[58] Field of Search ........................... 248/187.1, 183.1, 248/183.2, 435; 396/428

[56] References Cited

U.S. PATENT DOCUMENTS 5,267,712 12/1993 Shen .
5,365,293 11/1994 Nakatani ................. 396/428

Primary Examiner—Alvin Chin-Shue
Attorney, Agent, or Firm—Donald C. Casey, Esq.

[57] ABSTRACT

A tripod, which includes a tubular center post, a socket mounted on the center post, a plug cap fastened to the socket to secure a holder frame, a left side cover and a right side cover fastened to the holder frame to hold a platform, and a bush mounted on a cylindrical coupling portion of the holder frame and secured to the left side cover by a clamp and an adjustment screw to stop the holder frame from displacement relative to the left side cover, wherein the socket has a collar stopped above the tubular center post, two coupling spring strips plugged into the tubular center post, two raised positioning portions provided at the coupling spring strips and respectively forced into engagement with a respective positioning hole at the tubular center post, and a plurality of positioning holes spaced above the collar; the plug cap has a plurality of springy plug strips respectively plugged into the socket, and a plurality of raised positioning portions respectively provided at the springy plug strips and forced into engagement with the positioning holes at the socket.

1 Claim, 3 Drawing Sheets

TRIPOD

BACKGROUND OF THE INVENTION

The present invention relates to a tripod, and more specifically to the positioning arrangement of a holder frame at a center post in a tripod.

FIG. 1 shows a tripod for holding a camera according to the prior art. The tripod 10 comprises a shell 11, a center tube 12 mounted in the shell 11, three legs 13 pivoted to the shell 11, a sliding ring 14 moved along the center tube 12, three links 15 respectively coupled between the sliding ring 14 and the legs 13, a tubular center post 16 moved in the center tube 12 and locked by an elevator lock (not shown), the center post 16 having a longitudinal rack 161 meshed with an elevation adjustment gear at the shell 11, a socket 20 mounted on the top end of the center post 16, a holder frame 30 fastened to the socket 20 by a screw cap 21, and a platform 50 mounted on the holder frame 30 for holding a camera. The socket 20 is fixedly secured to the top end of the center post 16, and the screw cap 21 is threaded into the socket 20 to secure the holder frame 30 in place. If the screw cap 21 is not tightly fastened up, the screw cap 21 and the holder frame 30 may fall from the socket 20. Further, the threads of the screw cap 21 wear quickly with use. When the threads of the screw cap 21 start to wear, the screw cap 21 cannot be fastened to the socket 20 tightly.

SUMMARY OF THE INVENTION

The present invention has been accomplished to provide a tripod, which eliminates the aforesaid problem. According to the present invention, the socket has a collar stopped above the tubular center post, two coupling spring strips plugged into the tubular center post, two raised positioning portions provided at the coupling spring strips and respectively forced into engagement with a respective positioning hole at the tubular center post, and a plurality of positioning holes spaced above the collar; the plug cap has a plurality of springy plug strips respectively plugged into the socket, and a plurality of raised positioning portions respectively provided at the springy plug strips and forced into engagement with the positioning holes at the socket.

DETAILED DESCRIPTION OF THE PREFERRED EMBODIMENT

Figure 1:
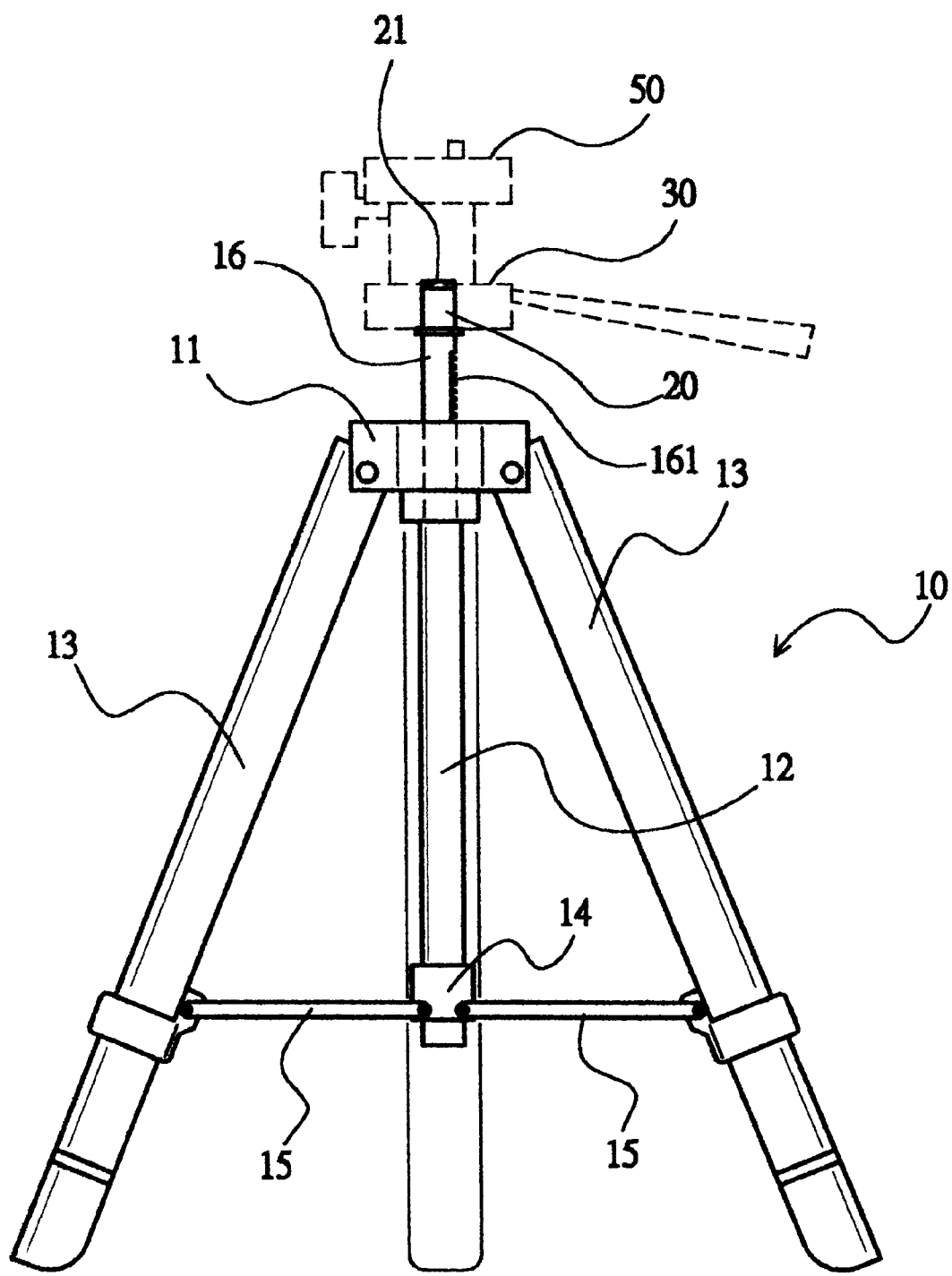
FIG. 1 illustrates a tripod according to the prior art.
Figure 2:
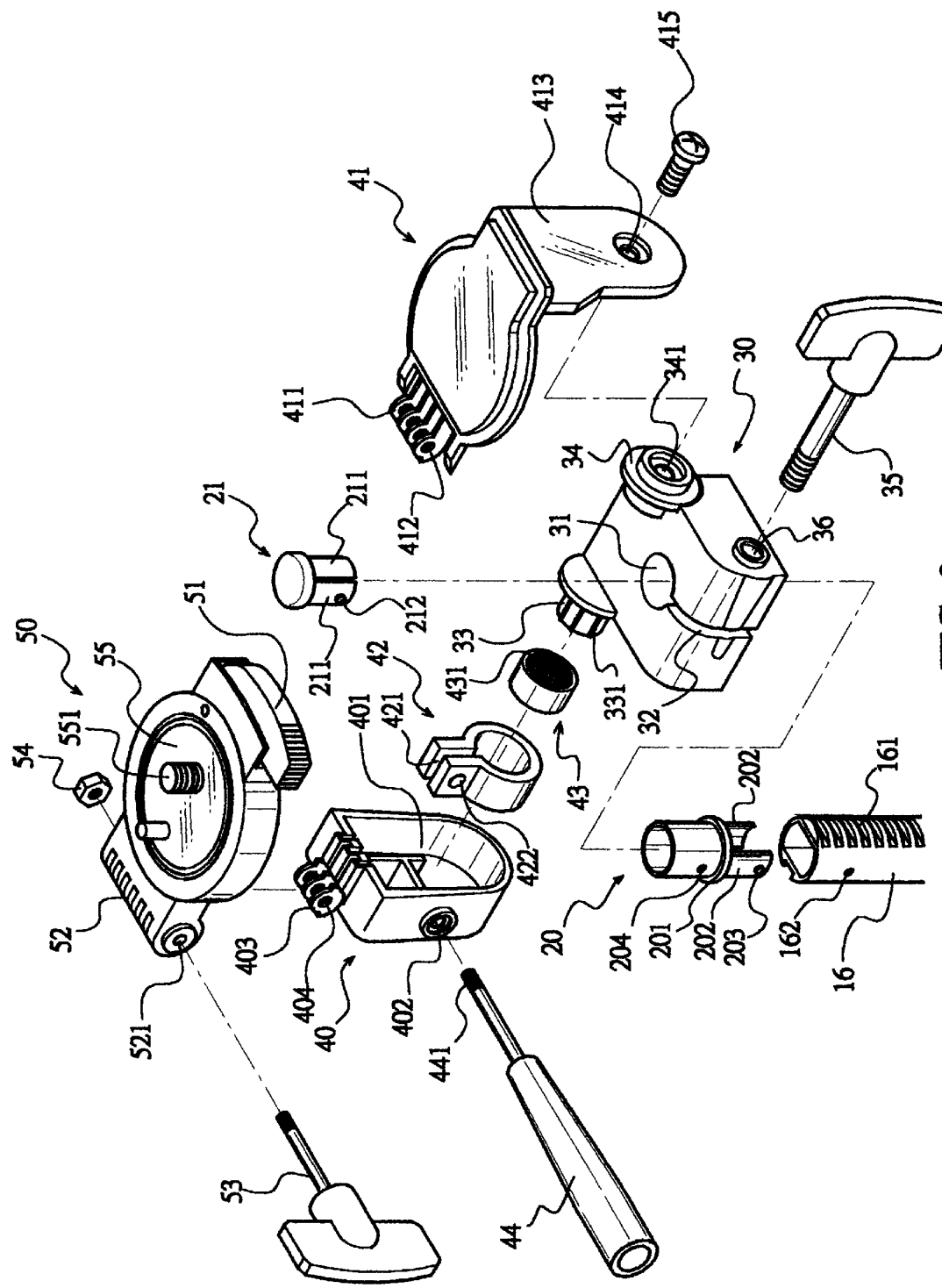
FIG. 2 is an exploded view of the present invention.

Referring to FIG. 2, the present invention comprises:

a tubular center post 16 inserted through a metal center tube (not shown) of the trip pod and moved in the metal center tube to the desired elevation, the tubular center post 16 comprising a longitudinal rack 161 for engagement with an elevation adjustment gear;

a socket 20 mounted on one end of the center post 16;

a holder frame 30, said holder frame 30 comprising a mounting hole 31 coupled to the socket 20, a split 32 extended from the mounting hole 31 to one peripheral side thereof, an internally threaded locating hole 36 extended across the split 32, a lock screw 35 threaded into the internally threaded locating hole 36 and fastened tight to close the split 32, a first cylindrical coupling portion 33 raised from a vertical left side wall thereof and having a plurality of axial teeth 331 spaced around the periphery for holding a left side cover 40, and a second cylindrical coupling portion 34 raised from a vertical right side wall thereof and defining an axial mounting hole 341 for holding a right side cover 41;

a plug cap 21 fastened to the socket 20 to secure the holder frame 30 to the socket 20 and the center post 16;

a left side cover 40 fastened to the vertical left side wall of the holder frame 30, the left side cover 40 comprising a receiving chamber 401, a side through hole 402, and a plurality of lugs 403 raised from the top side wall thereof and arranged in parallel, the lugs 403 each having a center through hole 404 respectively aligned;

an aluminum clamp 42 received inside the receiving chamber 401 in the left side cover 40, the aluminum clamp 42 having two distal ends disposed close to each other and separated by a gap 421, and two screw holes 422 respectively provided at the distal ends;

an aluminum bush 43 retained to the inside of the clamp 42 in the receiving chamber 401 and sleeved onto the first cylindrical coupling portion 33 of the holder frame 30, the aluminum bush 43 having a plurality of axial teeth 431 spaced around the inside wall thereof and respectively meshed with the axial teeth 331 at the first cylindrical coupling portion 33 of the holder frame 30;

an adjustment screw 44 inserted into the side through hole 402 at the left side cover 40, and threaded into the screw holes 422 at the two distal ends of the aluminum clamp 42 to fasten up the aluminum clamp 42, causing the aluminum clamp 42 to hold down the aluminum bush 43;

a right side cover 41 fastened to the vertical right side wall of the holder frame 30, the right side cover 41 comprising a plurality of parallel lugs 411 extended from the front side thereof and respectively inserted into the gap between each two adjacent lugs 403 at the left side cover 40, the lugs 411 each having a center through hole 412 respectively aligned, a vertical mounting wall 413 downwardly extended from the rear side thereof, and a mounting hole 414 provided at the vertical mounting wall 413 and fastened to the axial mounting hole 341 at the holder frame 30 by a tie screw 415; and a camera platform 50 fastened to the left side cover 40 and the right side cover 41, the camera platform 50 comprising a rotary platform body 55, an upright mounting screw 551 raised from the platform body 55 for mounting a camera, a platform lock 51 for locking the platform body 55, and a slotted coupling shell 52 coupled to the lugs 403 at the left cover shell 40 and the lugs 411 of the right side cover 41, the slotting coupling shell 52 having two through holes 521 connected to the center through hole 404 at each lug 403 of the left side cover 40 and the center through hole 412 at each lug 411 of the right side cover 41 by an adjustment screw 53 and a nut 54. When the adjustment screw 53 and the nut 54 are loosened, the camera platform 50 can be turned about the adjustment screw 53 to change its tilt angle within a limited range. After adjustment, the adjustment screw 53 and the nut 54 are fastened tight again.

Figure 3:
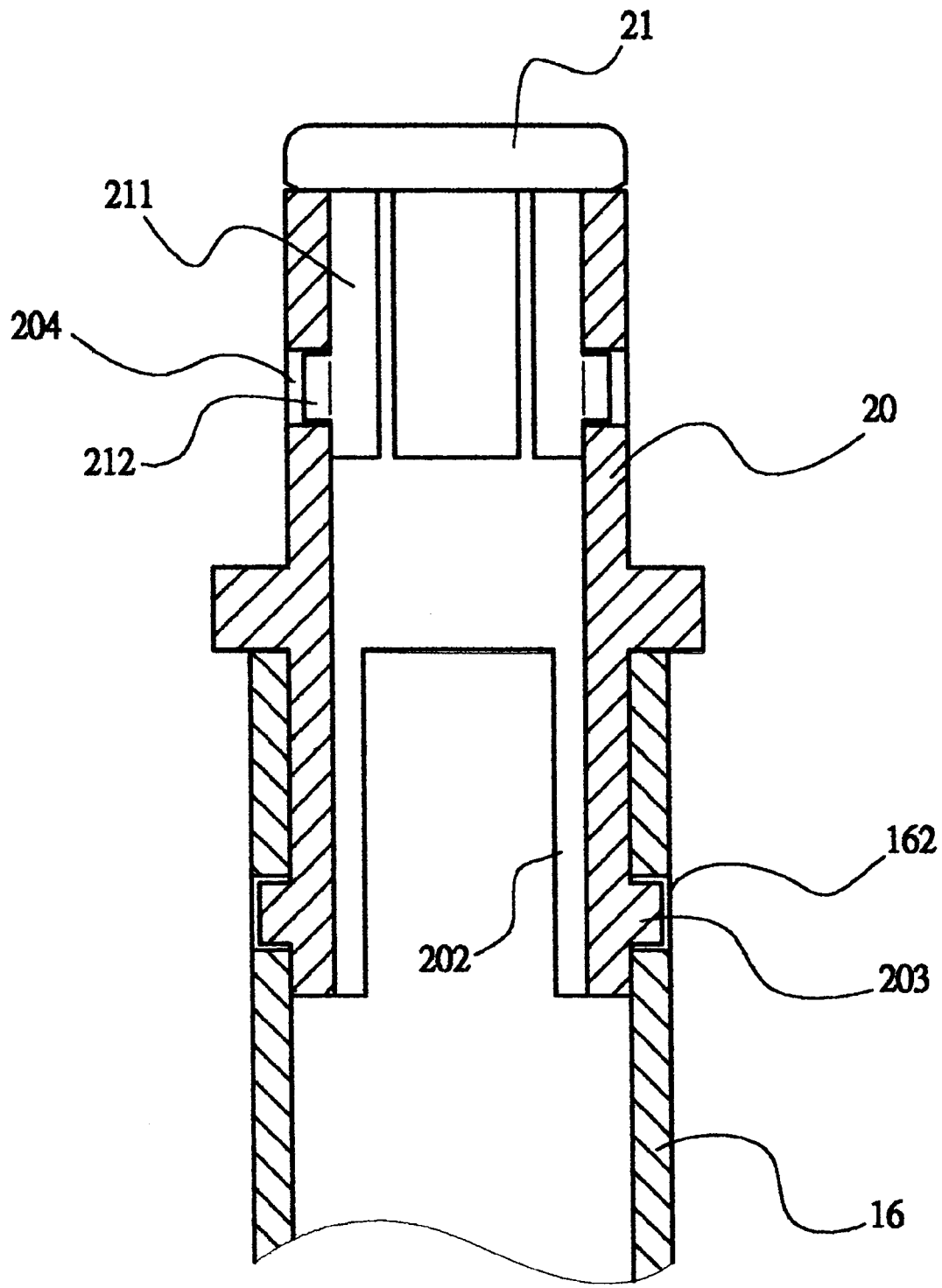
FIG. 3 is a sectional view in an enlarged scale of a part of the present invention, showing the socket fastened to the tubular center post, the plug cap fastened to the socket.

Referring to FIG. 3 and FIG. 2 again, the socket 20 comprises a collar 201 stopped at the top end of the tubular enter post 16, two coupling spring strips 202 bilaterally downwardly extended from the bottom side thereof and respectively plugged into the top end of the tubular center post 16, two raised positioning portions 203 respectively formed on the coupling spring strips 202 at an outer side and forced into engagement with a respective positioning hole 162 at the tubular center post 16, and a plurality of positioning holes 204 respectively provided through the peripheral wall thereof above the collar 201. The plug cap 21 comprises a plurality of downward springy plug strips 211 respectively plugged into the socket 20, and a plurality of raised positioning portions 212 respectively formed on the springy plug strips 211 at an outer side and forced into engagement with the positioning holes 204 at the socket 20.

Referring to FIG. 2 again, the axial teeth 331 of the first cylindrical coupling rod 33 of the holder frame 30 are respectively meshed with the axial teeth 431 of the aluminum bush 43, and the aluminum bush 43 is firmly secured to the left side cover 40 and the aluminum clamp 42 and the adjustment screw 44, therefore the holder frame 30 is prohibited from rotary motion relative to the aluminum bush 43 when the adjustment screw 44 is fastened tight.

What the invention claimed is:

1. A tripod comprising a leg assembly having a metal center sleeve and three legs pivoted to said metal center sleeve;

a tubular center post inserted through said metal center sleeve and locked by an elevator lock at said tubular center sleeve;

a socket mounted on said metal center post at topside;

a holder frame mounted on said socket, said holder frame comprising a mounting hole coupled to said socket, a split extended from the mounting hole thereof to one peripheral side thereof, an internally threaded locating hole extended across said split, a lock screw threaded into said internally threaded locating hole and fastened tight to close said split, a first cylindrical coupling portion protrudes from a vertical left side wall thereof, and a second cylindrical coupling portion protrudes from a vertical right side wall thereof and defining an axial mounting hole;

a plug cap fastened to said socket to secure said holder frame to said socket on said tubular center post;

a left side cover fastened to the vertical left side wall of said holder frame, said left side cover comprising a receiving chamber, a side through hole, and a plurality of lugs protrude from a top side wall thereof and arranged parallel to each other, the lugs of said left side cover each having a center through hole respectively aligned with each other;

an aluminum clamp received inside the receiving chamber in said left side cover, said aluminum clamp having two distal ends disposed close to each other and separated by a gap, and two screw holes respectively provided at the distal ends of said aluminum clamp;

an aluminum bush retained to the inside of said clamp in said receiving chamber and sleeved coupled to the first cylindrical coupling portion of said holder frame;

an adjustment screw inserted into the side through hole at said left side cover, and threaded into the screw holes at the two distal ends of said aluminum clamp to fasten up said aluminum clamp, causing said aluminum clamp to hold down said aluminum bush on said first cylindrical coupling portion of said holder frame;

a right side cover fastened to the vertical right side wall of said holder frame, said right side cover comprising a plurality of parallel lugs extended from a front side thereof and respectively inserted into respective gaps between two adjacent lugs at said left side cover, the lugs of said right side cover each having a center through hole respectively aligned with each other, a vertical mounting wall downwardly extended from a rear side thereof, and a mounting hole provided on said vertical mounting wall and fastened to the axial mounting hole on said holder frame by a tie screw; and a camera platform fastened to said left side cover and said right side cover, said camera platform comprising a rotary platform body, an upright mounting screw raised from said platform body for mounting a camera, a platform lock for locking said platform body, and a slotted coupling shell coupled to the lugs of said left side cover and the lugs of said right side cover, said slotted coupling shell having two through holes connected to the center through hole on each lug of said left side cover and the center through hole at each lug of said right side cover by an adjustment screw and a nut;

wherein said tubular center post comprises two positioning holes bilaterally disposed near a top end thereof; said socket comprises a collar for a butting the top end of said tubular enter post, two coupling spring strips bilaterally downwardly extended from a bottom side thereof and respectively plugged into the top end of said tubular center post, two raised positioning portions respectively formed on said coupling spring strips at an outer side and forced into engagement with the positioning holes on said tubular center post, and a plurality of positioning holes respectively provided through the peripheral wall of said socket above said collar; said plug cap comprises a plurality of downward springy plug strips respectively plugged into said socket, and a plurality of raised positioning portions respectively formed on said springy plug strips at an outer side and forced into engagement with the positioning holes on said socket; the first cylindrical coupling portion of said holder frame comprises a plurality of axial teeth spaced around the periphery thereof; said aluminum bush comprises a plurality of axial teeth spaced around an inside wall thereof and respectively meshed with the axial teeth on the first cylindrical coupling portion of said holder frame.

* * * * *